(12) United States Patent
Albanese (10) Patent No.: US 9,179,798 B2
(45) Date of Patent: Nov. 10, 2015

(54) METHOD AND APPARATUS FOR BREWING COFFEE AND THE LIKE

(71) Applicant: Alexander Elijah Albanese, Ypsilanti, MI (US)

(72) Inventor: Alexander Elijah Albanese, Ypsilanti, MI (US)

(*) Notice: Subject to any disclaimer, the term of this patent is extended or adjusted under 35 U.S.C. 154(b) by 226 days.

(21) Appl. No.: 13/748,914

(22) Filed: Jan. 24, 2013

(65) Prior Publication Data

US 2014/0205725 A1 Jul. 24, 2014

(51) Int. Cl.
| | | |
|---|---|---|
| *A47J 31/06* | (2006.01) | |
| *A47J 31/44* | (2006.01) | |
| *A47G 19/14* | (2006.01) | |
| *A47J 31/20* | (2006.01) | |

(52) U.S. Cl.
CPC .................................... *A47J 31/20* (2013.01)

(58) Field of Classification Search
CPC ....... A47J 31/20; A47J 31/0615; A47J 31/02; A47J 31/32; A47J 31/43; A47J 31/47; A47J 31/657; A47J 31/10; A47J 31/4489; A47J 31/4496
USPC ......... 99/295, 279, 287, 289 R, 289 D, 289 P, 99/290, 292, 297, 298, 301, 302 R, 302 P, 99/316, 317, 318, 319, 323, 322; 426/433; 220/625
See application file for complete search history.

(56) References Cited

U.S. PATENT DOCUMENTS

| | | | | | |
|---|---|---|---|---|---|
| 4,983,410 | A | * | 1/1991 | Dinos | 426/77 |
| 5,906,845 | A | * | 5/1999 | Robertson | 426/80 |
| 5,932,098 | A | * | 8/1999 | Ross | 210/337 |
| 6,026,732 | A | * | 2/2000 | Kollep et al. | 99/295 |
| 6,038,963 | A | * | 3/2000 | Patterson et al. | 99/287 |
| 6,231,909 | B1 | * | 5/2001 | Levinson | 426/433 |
| 7,849,784 | B2 | | 12/2010 | Adler | |
| 8,051,766 | B1 | * | 11/2011 | Yu et al. | 99/297 |
| 2002/0078831 | A1 | * | 6/2002 | Cai | 99/295 |
| 2005/0150390 | A1 | * | 7/2005 | Schifferle | 99/295 |
| 2005/0284303 | A1 | * | 12/2005 | Zell et al. | 99/279 |
| 2006/0011066 | A1 | * | 1/2006 | Bunn et al. | 99/279 |
| 2010/0005979 | A1 | * | 1/2010 | Baccetti | 100/37 |
| 2010/0319549 | A1 | | 12/2010 | Kelty et al. | |
| 2011/0151075 | A1 | * | 6/2011 | Peterson | 426/238 |
| 2012/0012008 | A1 | | 1/2012 | Kwok | |
| 2012/0058226 | A1 | * | 3/2012 | Winkler et al. | 426/79 |
| 2012/0207896 | A1 | * | 8/2012 | Rivera | 426/433 |
| 2012/0260806 | A1 | * | 10/2012 | Rolfes et al. | 99/285 |
| 2012/0308688 | A1 | * | 12/2012 | Peterson et al. | 426/86 |

OTHER PUBLICATIONS http://www.kickstarter.com/projects/inventiveculture/impress-coffee-brewer Believed to have been offered for sale, publicly used, and/or published prior to the filing date of this application.).
http://www.coroflot.com/kevinwwk/Eiffel-Coffee-Brewer (Believed to have been offered for sale, publicly used, and/or published prior to the filing date of this application.).

\* cited by examiner

*Primary Examiner* — Dana Ross
*Assistant Examiner* — Gyounghyun Bae
(74) *Attorney, Agent, or Firm* — Dinsmore & Shohl LLP; Allen M. Krass

(57) ABSTRACT

A method and apparatus for brewing coffee or the like uses a cartridge having filters on two opposed sides that is filled with ground coffee and then pressed through a container of heated liquid. The pressing forces the liquid into one filter, through the ground coffee, and out the other filter to produce the brewed beverage.

11 Claims, 12 Drawing Sheets

METHOD AND APPARATUS FOR BREWING COFFEE AND THE LIKE

FIELD OF THE INVENTION

The present invention relates to a method and apparatus for brewing coffee, tea or the like and more particularly to a method employing an apparatus wherein a cartridge of the material to be brewed, with input and output filters, is moved relative to a heated liquid.

BACKGROUND OF THE INVENTION

Brewing coffee or tea or the like involves bringing ground roasted coffee, tea leaves or the like into contact with heated water to infuse the water with the flavor of the grounds or leaves. Particular brewing devices are designed to practice variations of this method such as percolators, automatic coffee makers in which hot water drips onto coffee grounds held in a filter, and French presses in which ground coffee and hot water are combined in a cylindrical vessel and left to brew for a few minutes before a circular filter is plunged through the vessel to force the grounds to the bottom of the vessel.

Each of these methods has various advantages and disadvantages in terms of the strength and flavor of the brewed coffee, the time that it requires to brew the coffee, and the difficulty of brewing and cleaning the brewing apparatus after use, and coffee drinkers often advocate one method over the others.

Despite the number of alternative methods and apparatus for brewing coffee which are available, there still exists a need for a process and apparatus for performing the process which produces flavorful coffee or like beverages relatively quickly with the apparatus being quick and easy to use and clean after use.

SUMMARY OF THE INVENTION

The present invention is therefore directed to a novel method and apparatus for brewing coffee which produces a flavorful beverage and is inexpensive, quick and simple to use and easy to clean. The present invention is directed toward a method which may be viewed as an improvement in the French press method. In that process ground coffee and hot water are combined in a vessel which is usually cylindrical and left to brew for a few minutes. A filter having dimensions complementary to the cylinder so as to fit snugly in the cylinder is fixed to a plunger which is then pushed down from the top to force the grounds in the coffee to the bottom of the vessel and brewed liquid to pass through the filter to the top. Because the ground coffee is in direct contact with the water, all the coffee oils remain in the beverage, making it stronger than coffee made by an automatic coffee machine, but leaving some sediment in the brewed coffee. Many people object to the presence of coffee ground residues in the final product. Moreover, when compared to processes in which the water is forced through the coffee under some pressure, such as espresso machines, French brewed coffee often seems relatively mild.

The present invention broadly improves over the French press process by containing the coffee grounds or tea or the like in a closed cartridge which eliminates the need for a filter of the type used with a French press machine. The cartridge has filters both on its underside, which contacts the hot water and admits it into the cartridge as it is pressed down through a container of heated water, where the water is infused by the coffee, and on its top side through which the brewed coffee passes. The top filter may simply involve a small cross-section port, a mesh filter, or both.

The exit filter of this cartridge is fine enough to prevent any substantial amount of the ground coffee residue from passing with the brewed coffee into the upper portion of the container. The brewed coffee may then be poured from the top of the container into a separate drinking vessel. By adjusting the porosities of the input and output filters of the cartridge, or the size of the output port, the pressure of the liquid in the cartridge may be controlled thereby controlling the degree of infusion of the grounds into the liquid and the force required to plunge the cartridge through the liquid. In addition the brewed coffee exiting the output filter could pass through a user adjustable outlet valve.

In other embodiments of the invention, the brewing apparatus also allows a user to drink directly from the apparatus as well as to pour or selectively retain the brewed coffee in the apparatus. The basic brewing apparatus may be used in combination with an external power source for heating the liquid within the coffee maker.

All of these embodiments are capable of being used to produce cold beverages such as iced coffee, or to work with tea or other infusion materials.

BRIEF DESCRIPTION OF THE DRAWINGS

Other objects, advantages, and applications of the present invention will be made apparent by reviewing the following detailed description of the preferred embodiment and a number of alternative embodiments of the invention. The description makes reference to the accompanying drawings in which.

DETAILED DESCRIPTION OF THE PREFERRED EMBODIMENTS

The preferred embodiments of the invention described herein are intended to brew coffee and are described as such. However, the same structures or minor variations thereon could be used to brew tea leaves, herbs, or the like and use of the term coffee should not be taken as restrictive of the scope of the invention. Additionally, while the preferred embodiments are described as brewing heated beverages, in general they are capable of making cold beverages such as iced tea, cold brewed coffee, or the like.

In the disclosed embodiments the devices including the liquid containers are generally cylindrical but could be square or other configurations in cross-section.

Figure 1:
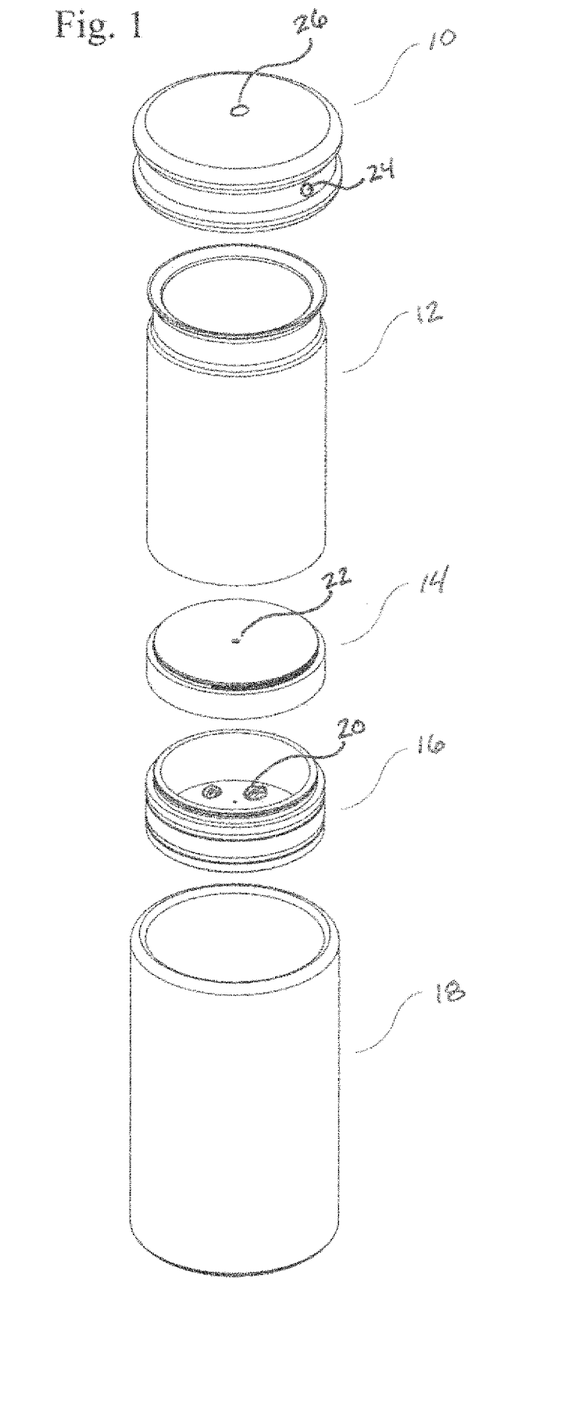
FIG. 1 is a perspective view, in exploded form, of the components of a first embodiment of the invention.
Figure 2:
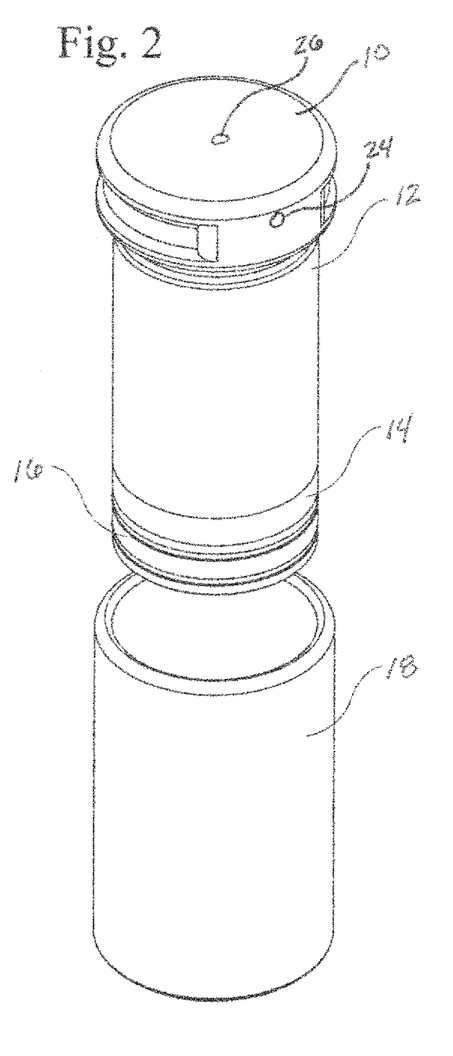
FIG. 2 is a perspective view of the embodiment of FIG. 1 with the components assembled into a lower open top container adapted to be filled with heated water or other liquid, and a cylindrical output container which supports a cartridge for receiving the ground coffees or the like in its lower end.

Referring to the FIGS. 1 and 2, a first embodiment of the invention is illustrated. It broadly comprises a cylindrical top cap 10, a cylindrical barrel 12, a cartridge lid 14, a cartridge body 16, and a liquid container 18. As illustrated in FIG. 2, the elements 10, 12, 14, and 16 may all be joined together into a unitary body with threaded connections, press fits, keyed connections or the like. The outer diameters of the barrel 12, cartridge lid 14, and cartridge body 16 are all cylindrical with diameters complementary to the inner diameter of the liquid container 18. Thus the barrel 12 may be pressed into the liquid container 18 through its open top and snugly fit within the inner diameter of the container. Previous to that, ground coffee is inserted into the hollow top of the cartridge 16 which is closed off by the screw lid 14. Heated water or other liquids are placed within the container 18, or, for hot beverages, the liquid may be heated within the container, preferably by electrical resistance heating elements or by microwave energy. The sides of the cartridge body 16 are grooved to receive upper and lower O-rings, with similar resilient seals 17a and 17b, (FIG. 3) which allow sections of the seals to project beyond the sides of the cartridge and bear against the inner diameter of the liquid container 18. The other embodiments of the invention incorporate similar seals.

The proportions of the water and coffee are a function of the strength of the brew that it is desired. The water is typically boiled so that when it is poured into the container 18, which is typically cooler, its temperature has dropped to the range of about 170 to 190 degrees F. This is typically considered to be the desired brewing temperature for coffee in a French press.

Figure 3:
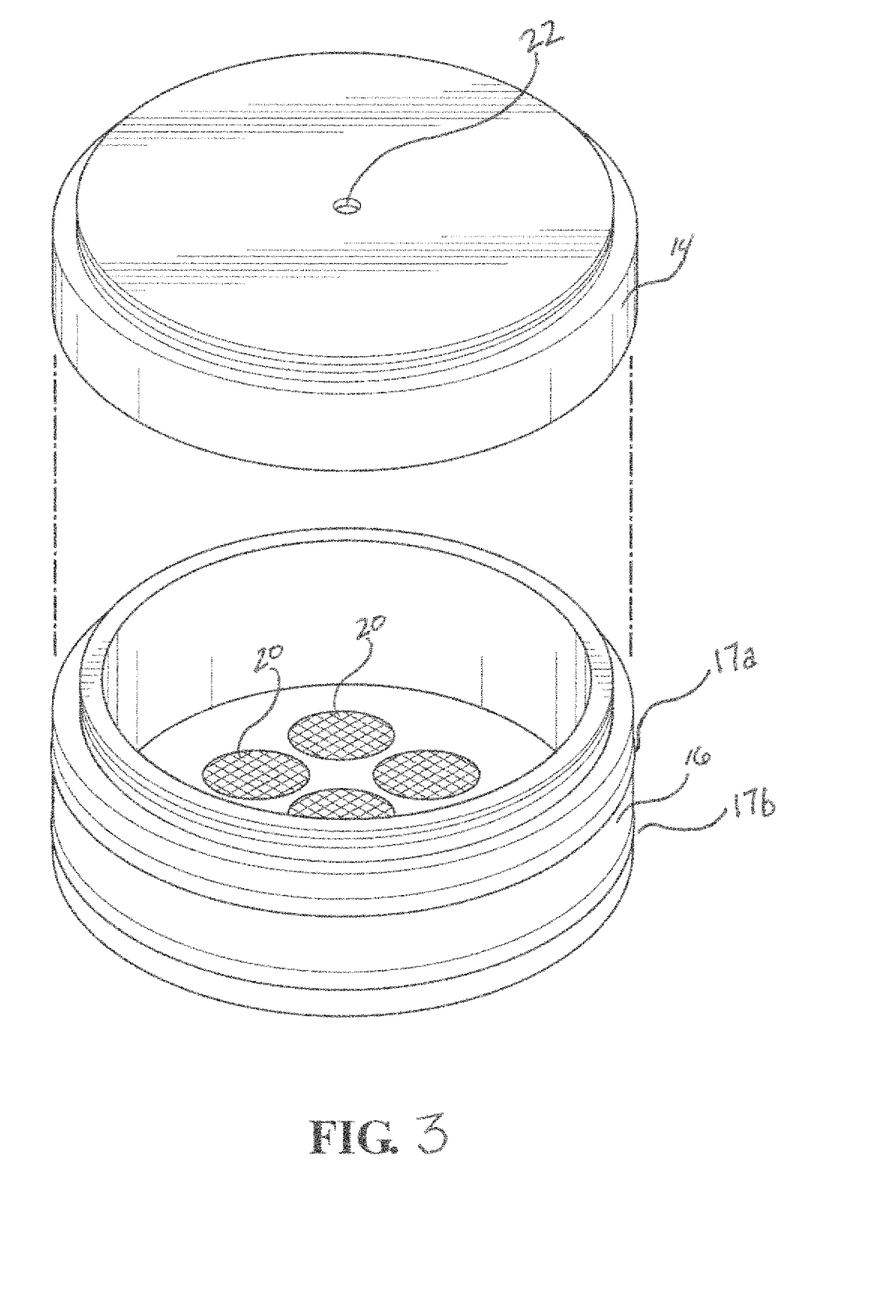
FIG. 3 is a perspective view of the coffee cartridge with its screw lid positioned above the cartridge.

In use the cartridge body 16, illustrated in FIG. 3, should be filled with the desired quantity of ground coffee or the like and then covered by attaching the cartridge lid 14. The bottom of the cartridge body contains a filter 20 which may be divided into one or more separated areas and the cartridge lid 14 contains an outlet port 22. When the barrel assembly with the attached cartridge 16 is plunged into the liquid container 18, the heated liquid in the container 18 is forced through the filter 20 into the cartridge body where the liquid becomes infused with the ground coffee or the like. The infused liquid is then forced out of the cartridge lid 14 through the port 22.

The size of the filter area 20 and the outlet port 22 may be controlled so as to set the pressure experienced by the liquid as it passes through the cartridge body. The outlet port 22, and any port filter, will preferably be of smaller area than the input filters 20 so as to create some pressure within the cartridge body. The port 22 is either small enough, or equipped with a fine filter, to prevent any appreciable quantity of the coffee grounds in the cartridge 16 from passing through with the brewed beverage.

The coffee exiting from the port 22 enters the barrel 12 which is covered by the top cap 10. As illustrated in FIG. 1, the top cap may have a side port 24 from which any pressurized steam may escape. The top cap may also be equipped with a central port 26 at its top. The port 26 also allows venting both during the plunging of the barrel into the liquid container and the extracting of the plunging barrel.

When the elements of FIG. 1 are joined together by either mating screw surfaces, or interface fits, into the plunging assembly centered on the barrel 12, and the cartridge 16 has been filled with coffee and the container 18 with the heated liquid, the barrel may be grasped at its top end and plunged downwardly into the container, through its open top, thus forcing the heated liquid into the cartridge body 16 through the filter 20 and out of the cartridge body, after infusion with the ground coffee, through the port 22 into the barrel 12. In this plunging process, the resistance to fluid flow created by the port 22 will control the resistance the user experiences while plunging and thus the rate at which the user plunges for a given plunging force. This affects the final brew characteristics by varying the time of plunging and thus the time of brewing.

The beverage may then be consumed directly from the barrel 12 by removing the cap 10 or it may be poured into another container, such as a coffee cup, for consumption.

Alternatively to filling the cartridge 16 with lose ground coffee, the coffee or the like could be contained in a disposable pod or simply between upper and lower plates which trap the grounds.

Figure 4:
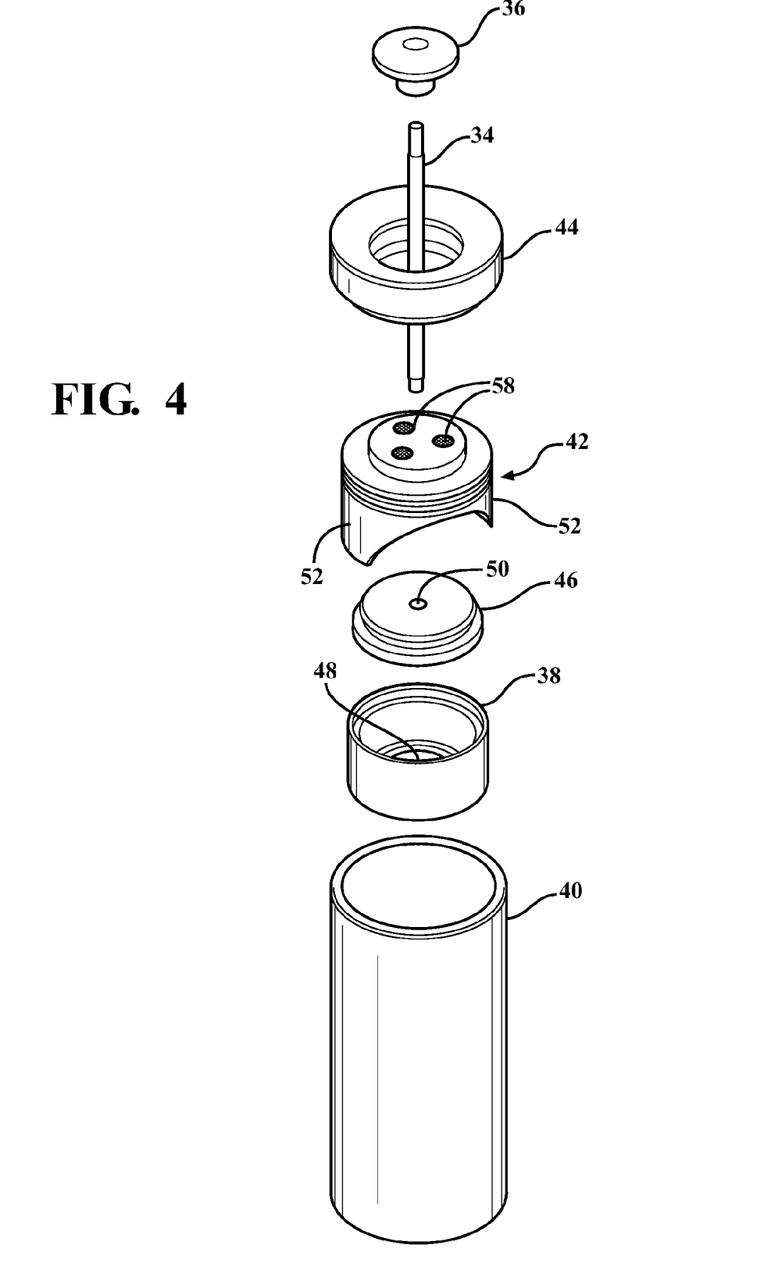
FIG. 4 is an exploded perspective view of the components of a second embodiment of the invention wherein the grounds-containing cartridge is pressed into the heated liquid container using a rod with a handle at its end.
Figure 5:
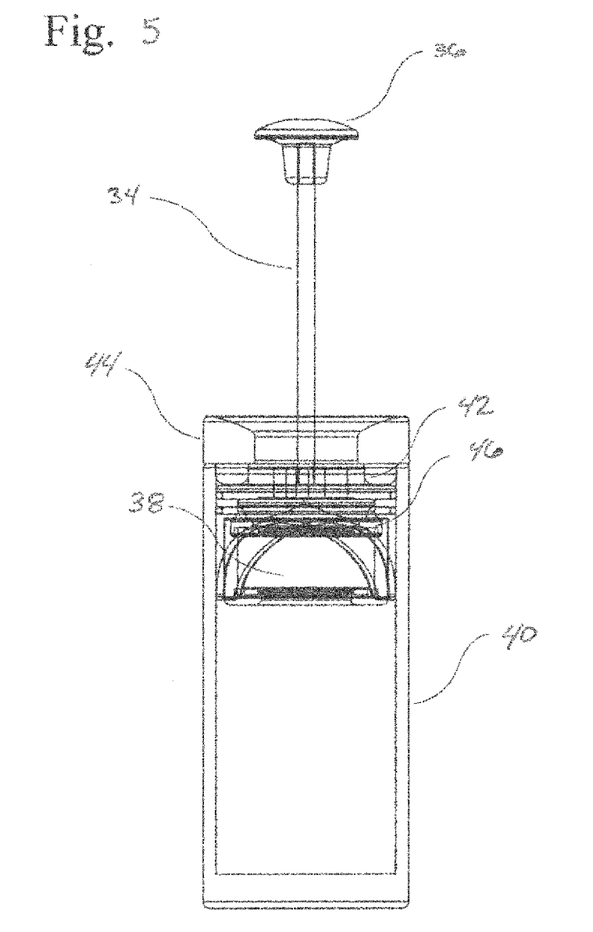
FIG. 5 is a cross-sectional view of the embodiment of the invention illustrated in FIG. 4 with the grounds-containing cartridge disposed at the top of the heated liquid container ready to plunge.

A second embodiment of the present invention is illustrated in exploded form in FIG. 4 and in assembled form in FIG. 5. The second embodiment of the invention broadly employs a solid rod 34 to connect a handle 36 to a cartridge 38 for the ground coffee which may be then plunged into a liquid container 40. The rod 34 is connected to the cartridge 38 through a ported carrier 42 which supports the cartridge 38 and gives stability to the cartridge as it moves through the inner diameter of the liquid container 40. It also provides an area to decelerate and redirect substances flowing out of the cartridge 38 during plunging to prevent any high pressure, uncontrolled spray of the contents of the container up and out of the apparatus during the plunging operation.

The connections between the various components of the second embodiment, as well as the other embodiments, can be made by screw threads, interference fits, key locking connectors, and the like.

As illustrated in FIG. 5, the handle 36 may be connected to the top of the rod 34. The rod may then be passed through the central hole in the cap 44 which is adapted to thread onto the top of the liquid container 40. The lower end of the rod 34 is threaded and is adapted to be joined to the top of ported carrier 42. The ported carrier in turn screws to the outside of a coffee cartridge cap 46.

Like the embodiment of FIG. 1, the coffee cartridge 38 has a bottom filter 48 and the screw cap 46 for the cartridge has a central output port 50. The ported carrier 42 has a pair of downward directed fins 52 having outer diameters complementary to the inner diameter of the liquid container 40 to stabilize the cartridge 38 as it is plunged into the liquid container 40. The ported carrier 42 further has output filter areas 58 on its upper surface which diffuse the upward flow through the port 50 when the cartridge 38 is plunged into the container 40.

FIG. 5 is a cross-section through the elements illustrated in FIG. 4 assembled into the second embodiment of the invention.

Figure 6:
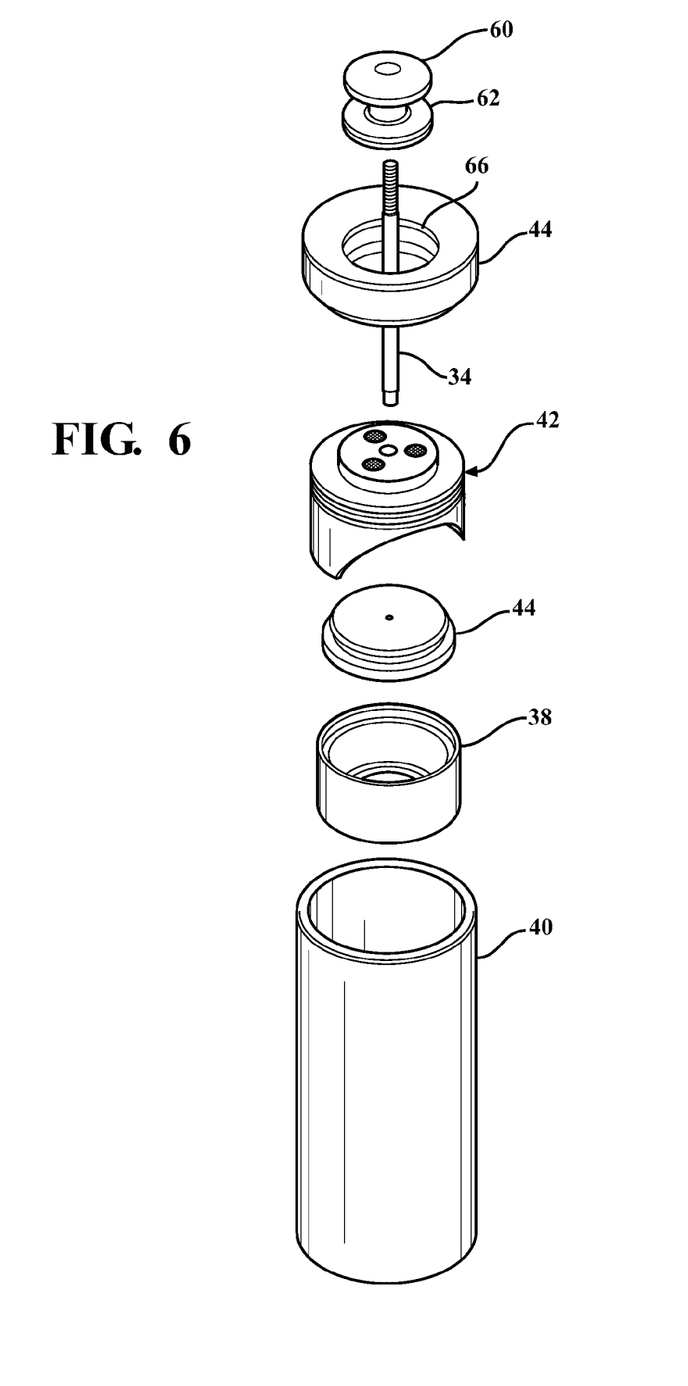
FIG. 6 is a perspective view of an exploded version of a third embodiment of the invention which is a variation of the second embodiment with elements to act as a sealing valve against the container for heated liquid.
Figure 7:
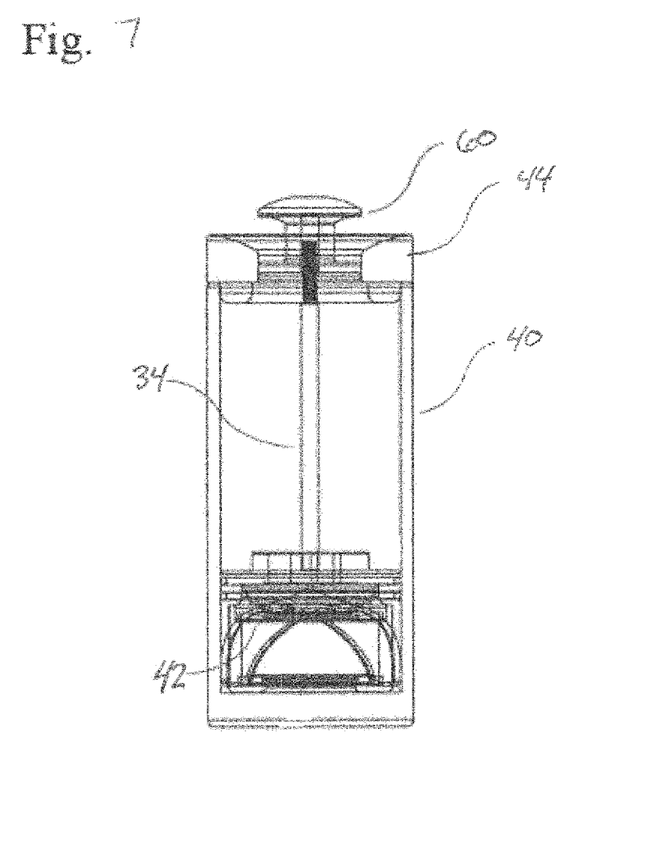
FIG. 7 is a cross-section, through an assembled version of the embodiment illustrated in FIG. 6 with the grounds cartridge disposed at the bottom of the heated liquid container.
Figure 8:
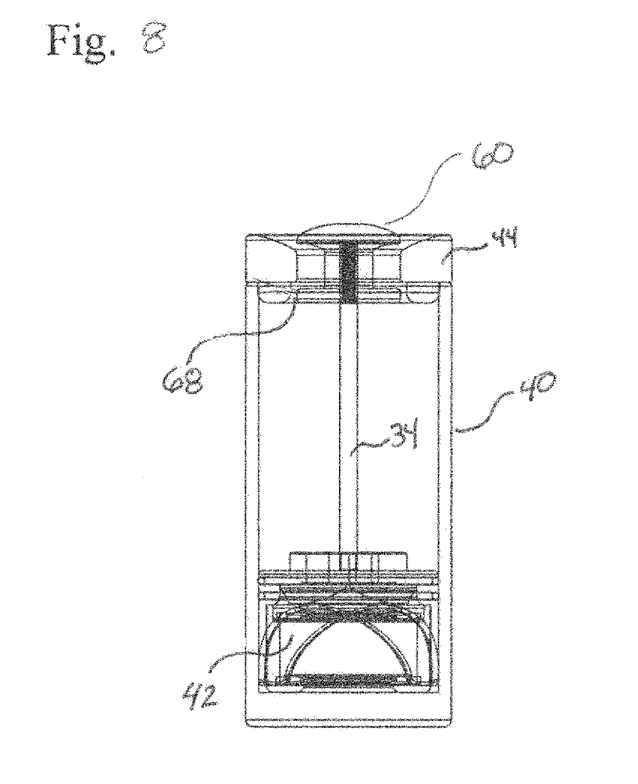
FIG. 8 is a cross-section through an assembled version of the embodiment illustrated in FIG. 6 with the grounds cartridge disposed at the top of the heated liquid container.

An alternative embodiment of the invention, illustrated in FIGS. 6, 7, and 8, is very similar to the second embodiment illustrated in FIGS. 4 and 5, with the exception of employing a handle 60 formed with a stopper 62. Otherwise, the same numerals are employed in FIGS. 6-8 that were employed for FIG. 4.

The stopper 62 is sized to completely obstruct the central opening 66 (FIG. 6) in the cap 44 when the handle 60 is in its closed position illustrated in FIG. 7. In this state the coffee container may be stored empty. In the open position illustrated in FIG. 8, the handle has been moved to an open position. In this position a flow gap 68 is formed between the stopper section 62 and the hole 66 in the cap 44 through which there is adequate clearance for emptying the contents of the container 40 for pouring or drinking.

Alternative to rotating the handle 60 on its threaded connection with the rod 34 to move between the open and closed states, another mechanism such as a key or spring-loaded mechanism could be employed.

Figure 9:
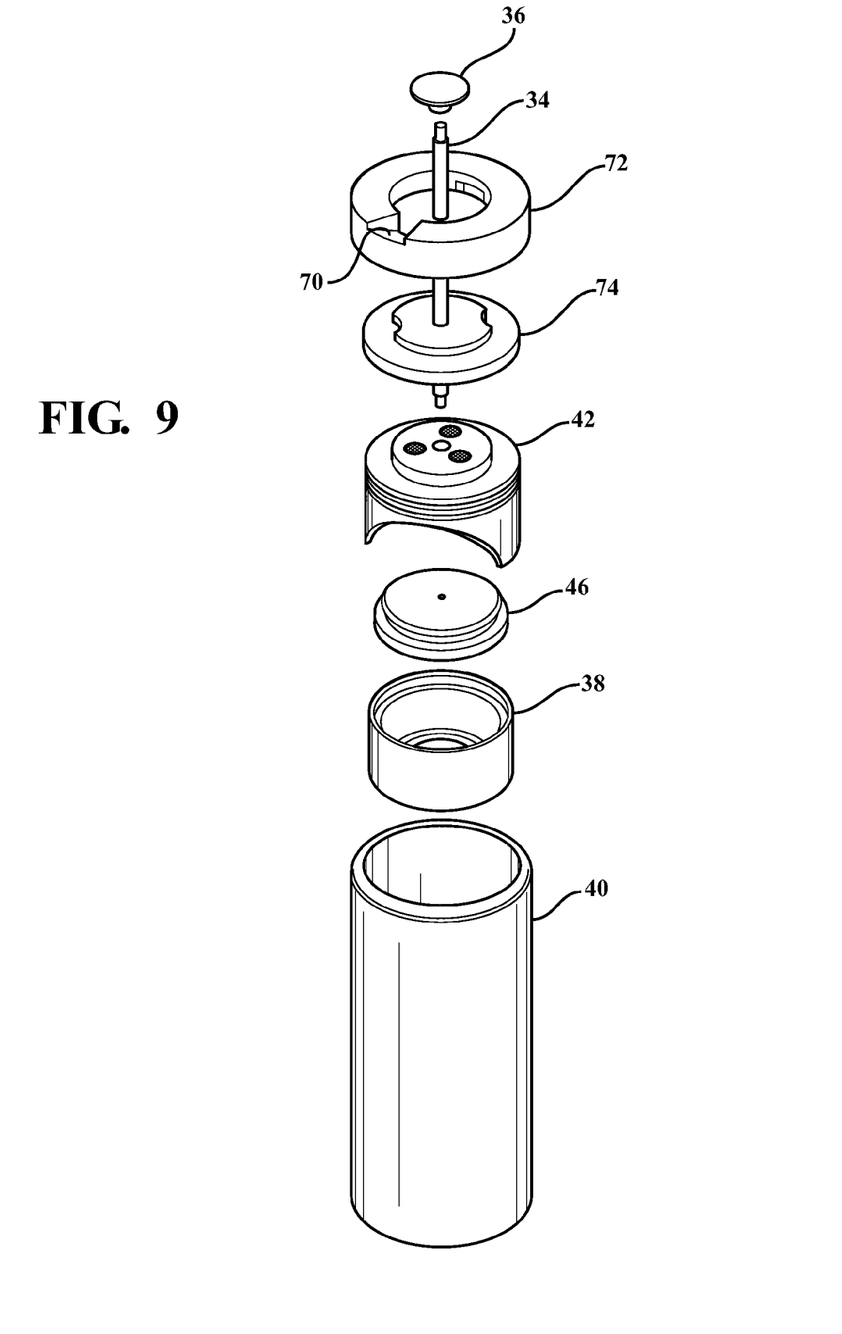
FIG. 9 is an alternative embodiment of the invention illustrated in perspective exploded form which incorporates an alternative lid assembly and handle design that allows the user to drink directly from the brewing apparatus, as well as pour and selectively seal the brewed contents.
Figure 10:
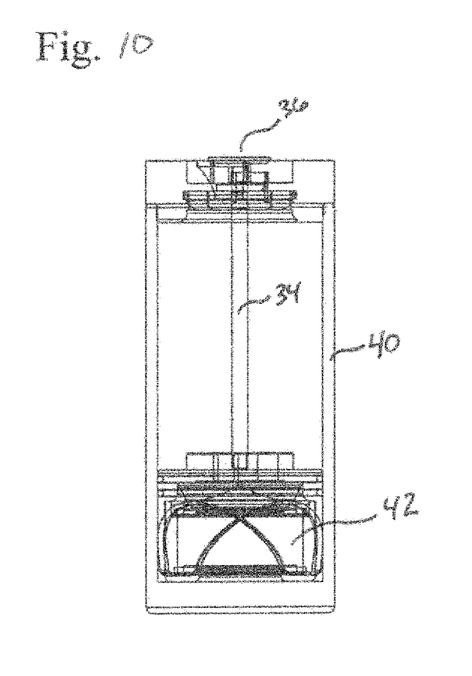
FIG. 10 is a perspective view of the embodiment of FIG. 10 in assembled form with the cartridge handle depressed to the lower limit.

Still another embodiment of the invention, a fourth embodiment, is illustrated in FIGS. 9 and 10. FIG. 9 is comparable to FIG. 4 except for the provision of a pour spout 70, a modified cap 72, and the provision of a cooperating cap valve 74 between the cap 72 and the ported carrier 42.

In FIG. 10 this fourth embodiment of the invention is shown after plunging. After completing the plunging operation, the cap valve 74 may be utilized to either open or close the cap 72 by rotating the cap 72 clockwise or counterclockwise relative to the cap valve 74. With the cap 72 in its open position relative to the valve 74, the final contents of vessel 40 are ready for pouring. With cap 72 in its closed position relative to the valve 74, the contents of the container 40 are partially or completely sealed.

Figure 11:
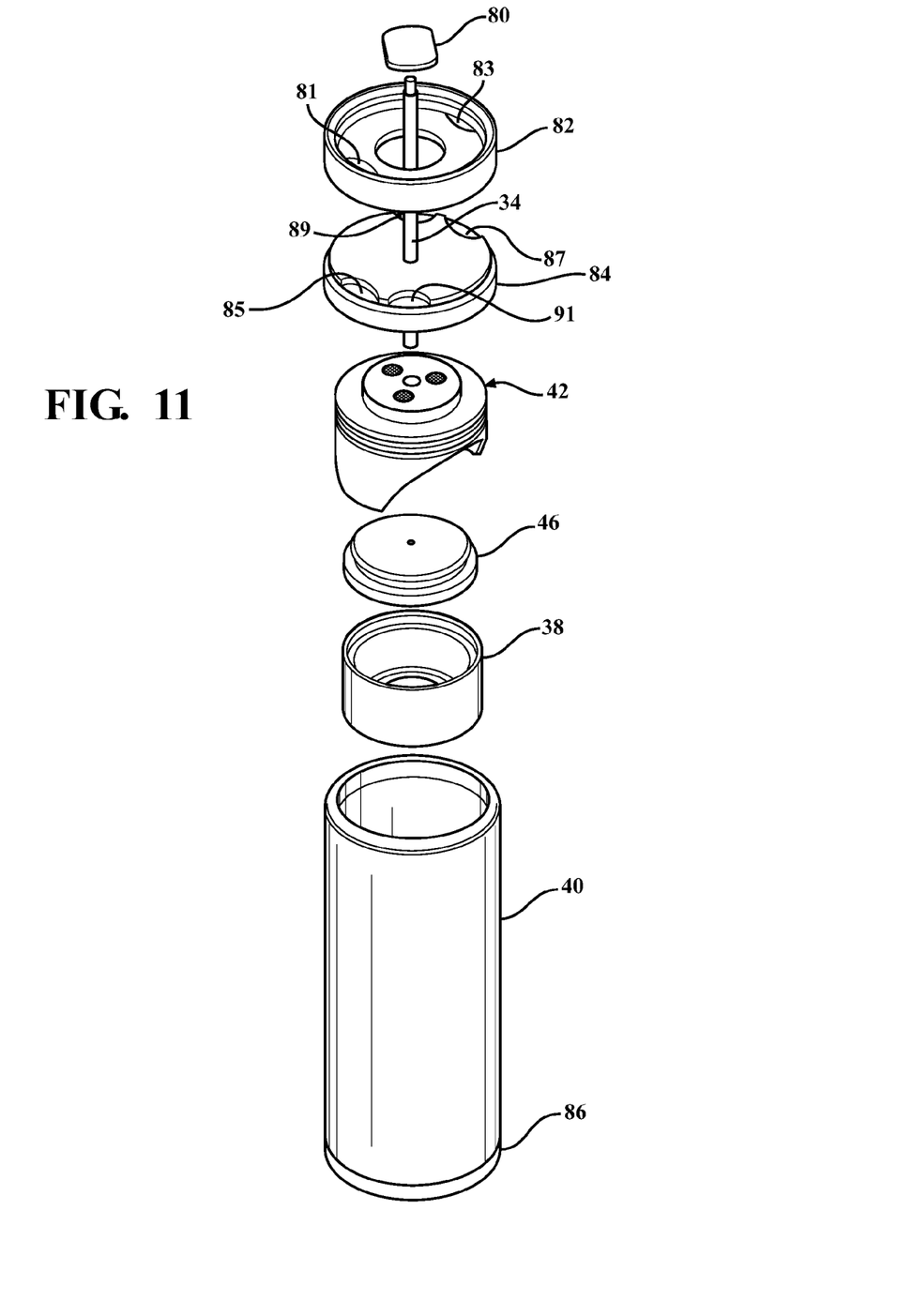
FIG. 11 is an exploded view of a fifth embodiment of the invention employing an alternative lid assembly, handle design and removable bottom.
Figure 12:
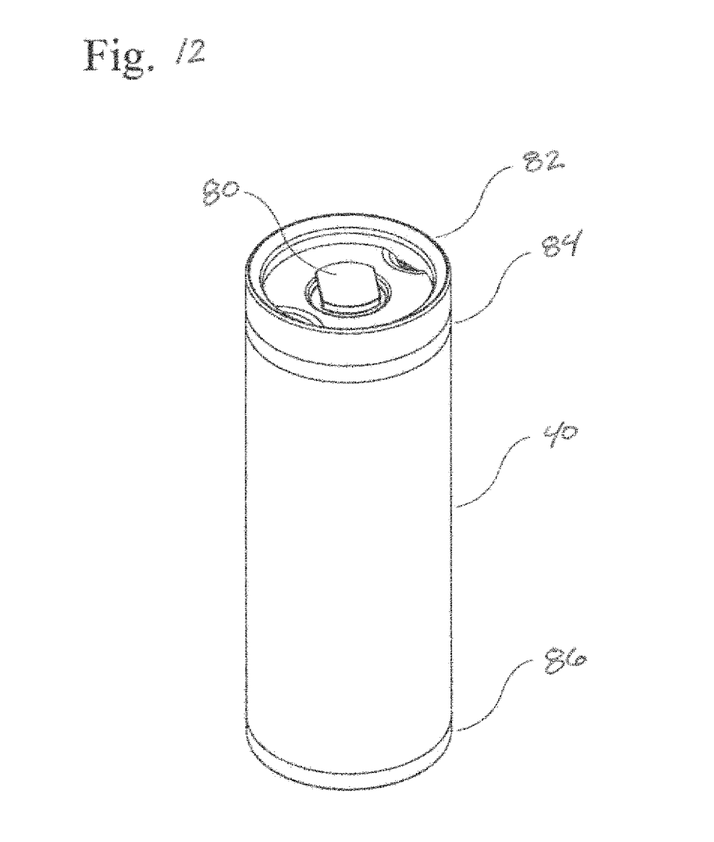
FIG. 12 is an assembled view of the fifth embodiment.

A fifth embodiment of the invention, illustrated in FIGS. 11 and 12, employs an alternative lid assembly and handle design that allows a user to drink directly from the apparatus as well as pour and selectively seal the contents of the container. In the exploded view of FIG. 11 those elements which are common with the exploded view of FIG. 4 have been given the same numbers. A modified form of handle 80, cap 82, cap valve 84, and a vessel cap bottom 86 have been provided. The low profile handle eliminates interference with the user's face when drinking from the apparatus.

Cap 82 may be rotated relative to cap valve 84 to selectively allow drinking, pouring or sealing of the contents of liquid container 40. Cap 82 has a pouring opening 81 and a relatively smaller drinking opening 83 to allow appropriate flow for pouring or drinking and to minimize the likelihood of accidental spillage. Cap valve 84 has a pouring passage 85, pouring vent 87, drinking passage 89, and drinking vent 91. By rotating cap 82 to align pouring opening 81 with pouring passage 85, drinking opening 83 is aligned with pouring vent 87, allowing vented pouring from pouring opening 81. By rotating cap 82 to align drinking opening 83 with drinking passage 89, pouring opening 81 is aligned with drinking vent 91, allowing vented drinking from drinking opening 83. Cap 82 may be further rotated relative to cap valve 84 so that no openings on cap 82 align with any passages or vents on cap valve 84, thus selectively sealing the contents of liquid container 40.

The bottom cap 86 which is removably screwed into the open bottom end of the container 40 allows the container 38 to be easily cleaned after use. The container 38 may be separated from the ported carrier 42 by unscrewing it or with other suitable removable connections. A reloaded cartridge could be connected to the ported carrier to allow the preparation of a second portion of coffee or the like.

The assembled version of the fifth embodiment of the invention is shown in FIG. 12.

Having thus described my invention, I claim:

1. Apparatus for brewing coffee or tea, comprising:
   a container for hot water having a closed bottom, upright sides of substantially uniform cross-section and an open top;
   a top cap for the container having an opening;
   a cartridge having a bottom and a spaced top with width dimensions complementary to the cross-section of the liquid container between said upright sides of the liquid container, the bottom containing an input filter, and the top containing an output port, with the cartridge being openable to allow ground coffee or tea to be disposed in the cartridge between the input filter and the output port; and
   a grip attached to the cartridge for moving the cartridge through the container;
   whereby, when a user fills the cartridge with coffee or tea and the container with water and then uses the grip to force the cartridge toward the bottom of the container, through the water, the water is forced through the cartridge input filter, through the ground coffee or tea, and out of the cartridge output port, to produce brewed coffee or tea in the volume of the container above the cartridge.

2. The apparatus of claim 1 wherein the liquid filling the liquid container is heated.

3. The apparatus of claim 1 wherein the input filter of the cartridge is of higher porosity than the output port of the cartridge, to impose pressure on the liquid as it passes through the cartridge.

4. The apparatus of claim 1 wherein the output port comprises a filter with a fineness sufficient to substantially retain the ground coffee or tea within the cartridge during the passage of the cartridge through the container.

5. The apparatus of claim 1 further comprising a user adjustable valve associated with the output port.

6. The apparatus of claim 1 further comprising a volume in the container operative to receive the brewed coffee or tea passing through the output port of the cartridge.

7. The apparatus of claim 1 wherein the grip is manual.

8. The apparatus of claim 1 wherein the liquid container and the upright sides of the cartridge are both cylindrical.

9. The apparatus of claim 1 wherein the grip comprises an elongated rod connected to a handle at one end and to said cartridge at the opposite end.

10. The apparatus of claim 1 wherein the output port of the cartridge comprises a filter.

11. Apparatus for brewing coffee or tea, comprising:
    a liquid container having a closed bottom, upright sides of substantially uniform cross-section and an open top;
    means for filling the liquid container with liquid; and
    a cartridge having upright sides with dimensions complementary to the cross-section of the liquid container between said upright sides of the liquid container, and a bottom and top, both the bottom and the top extending across the sides of the cartridge, the bottom containing an input filter, and the top an output port filter, with the cartridge being openable to allow ground coffee or tea to be disposed in the cartridge between the input and output port filters whereby plunging the cartridge through the container for liquids from the top toward the bottom of the container forces the liquid in the container into the cartridge, through said input filter, through the ground coffee or tea, and out of the cartridge through the output port filter, produces brewed coffee or tea in the volume of the container above the cartridge.

\* \* \* \* \*